UNITED STATES PATENT OFFICE.

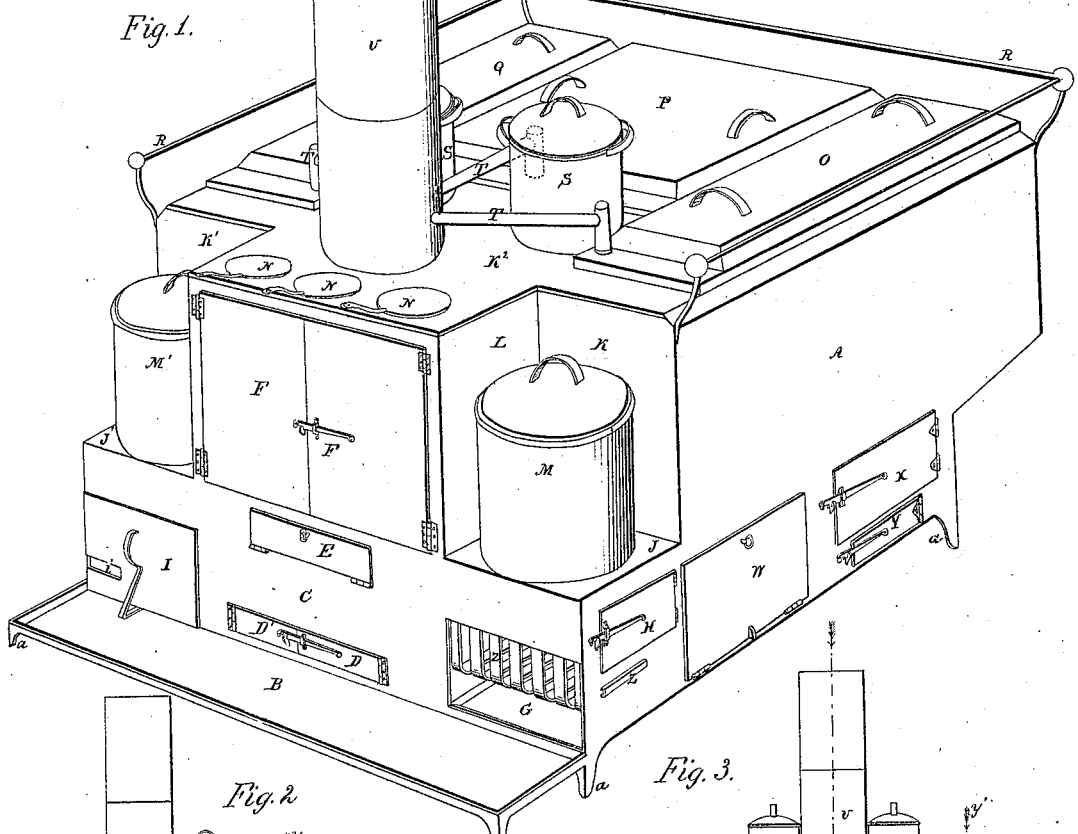
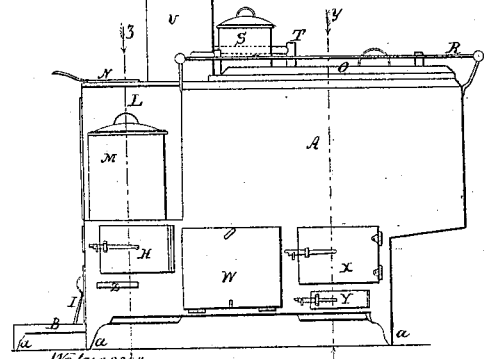
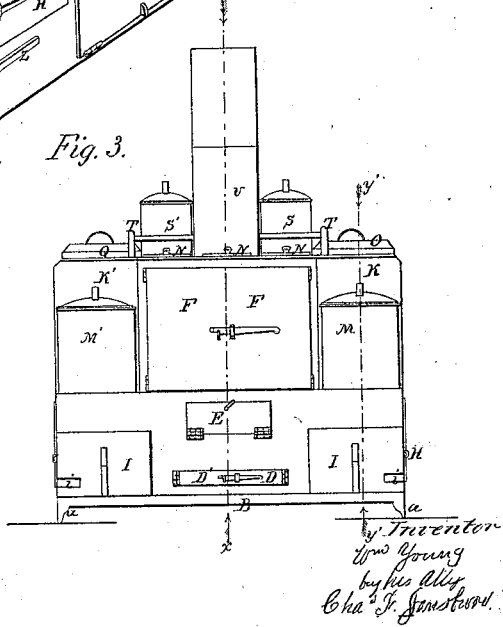

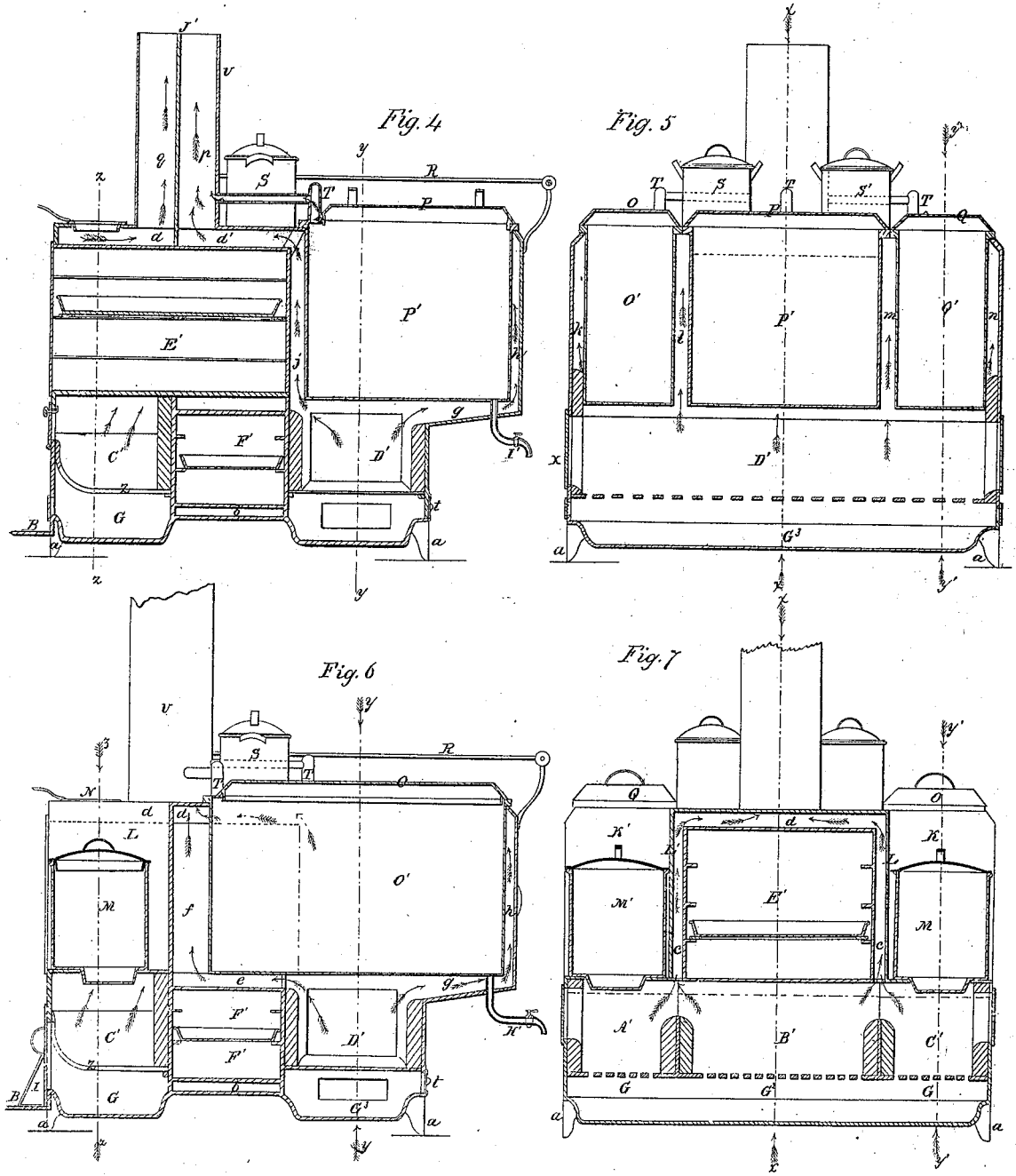
W. Young,
Ship's Galley,
N° 46,313. Patented Feb. 7, 1865.

WILLIAM YOUNG, OF WASHINGTON, DISTRICT OF COLUMBIA, ASSIGNOR TO HIMSELF AND CHAS. F. STANSBURY, OF PHILADELPHIA, PA.

SHIP'S GALLEY.

Specification forming part of Letters Patent No. 46,313, dated February 7, 1865.

*To all whom it may concern:*

Be it known that I, WILLIAM YOUNG, of the city of Washington, in the District of Columbia, have invented a new and Improved Ship's Galley or Caboose; and I do hereby declare the following to be a full and correct description of the same, reference being had to the accompanying drawings, in which—

Figure 1 is a perspective view of my improved galley complete. Fig. 2 is an end elevation of the same. Fig. 3 is a front elevation. Fig. 4 is a vertical central section from front to rear on line $x\,x$ of Fig. 3. Fig. 5 is a vertical section on line $x\,x$ of Fig. 2. Fig. 6 is a vertical section on line $y'\,y'$ of Fig. 5, and Fig. 7 is a vertical section on line $z\,z$ of Fig. 4.

The same letter indicates the same part wherever it occurs.

My invention consists in an improved construction and arrangement of the various parts of the galley, whereby I obtain an improved draft, larger cooking capacity, greater compactness, increased convenience, and better adaptation to the peculiar requirements of a cooking apparatus on which meals, varying extremely in quantity and quality, have to be prepared in the course of the same day.

The cabooses heretofore and still used in the Navy have been made for burning wood exclusively, and hence have been open to serious objections. The expensiveness of this species of fuel and the difficulty of obtaining it in may ports are not the principal of these. The danger from its use is much greater, and its efficiency for producing a steady heat for baking purposes is much less than that of coal. Burned as it is in the present cabooses on open grates, much of the heat is wasted, and consequently a greater quantity of fuel is consumed, and a much longer time required in the cooking of a given quantity of material than are necessary in my improved apparatus. Economy of space and fuel are peculiarly necessary on board ship; and on vessels of the Navy, as well as on large merchantmen and passenger steamers, a cooking apparatus is desirable which will readily cook the meals for a large crew, and yet be capable of such reduction as to be not more than sufficient for the economical preparation of the meals of a small mess of officers, or even of a single individual. Facilities for baking bread are also in the highest degree desirable, while I believe they are not possessed by any caboose heretofore used on our naval vessels. I have aimed to remedy the defects of the galleys in use in my improved apparatus, in which I use coal as a fuel, make available every portion of the space for the speedy preparation of a meal for a large crew and for baking bread at the same time, and yet can so diminish the cooking capacity as to make it equal to the preparation of a meal for a single person. Economy of space and fuel and great range of cooking capacity constitute the leading features of this invention.

To enable others skilled in the art to make and use my improved galley, I will proceed to describe its construction and operation, referring to the drawings, whereon—

A marks the side plates of the galley; B, the hearth or bottom plate supported on the feet $a$, and C the front plate. Openings in the front plate, C, are closed by the ash-pit doors D D', the fire-door E, oven-doors F F', and blowers or dampers I. The front portion of the galley consists of three fire-places, a large baking-oven and two boiler-recesses. The recesses are formed by the top plates J J' and the back and side plates K K' L L', the plates J J' being perforated to receive the boilers M M', as shown in Fig. 1. The boiler-holes may be covered by griddles, as at N N N, or other cooking utensils, as preferred. The rear portion of the galley is mainly occupied by the three great boilers O' P' Q', the covers of which, O P Q, are shown in Fig. 1. A rail, R, runs around and incloses the top of the after part of the galley. In front of the great boilers are placed the round boilers S S'. Pipes T run from all these boilers into the chimney U for the purpose of conveying off the steam. The chimney U is surmounted by a turning hood, V, of the usual form, and is divided into two flues by the partition J', to separate the currents of air, &c., from the front fires from those from the rear fire. (See Fig. 4.) The side plates A have openings in them which are closed by the door W of the lower oven, F', the door X of the rear fire-place, the door Y of the rear ash-pit, and the slide Z and door H, leading to the side fires, A' C', of which the grates are marked Z' and the ash-pits G.

The lower oven, F', runs through from side to side of the galley between the front and rear fires and its bottom is protected from the contact of cold air by the air-chamber $b$, Figs. 4 and 6. The rear fire-place, D', runs through from side to side, as shown in Fig. 5, under the three great boilers. Its ash-pit $G^3$ has a door at each end and a slide, $t$, on the rear side to facilitate the cleaning of the ash-pit, as well as for purposes of draft. The front oven, E', extends back over the front fire B' and the lower oven, F'. It is heated at bottom by the middle fire, B, and by the products of combustion from the rear fire, D', and it is heated on the sides, back, and top by the heated products of combustion from the front and rear fires.

The products of combustion from the front fires A' B' C' pass up the flues $c$ into the space $d$, which communicates with the front flue, $q$, of the chimney U. The space $d$ is divided in the same manner as the chimney, so as to separate the draft from the front fires from that from the rear fire. (See Figs. 4, 6, and 7.)

The flues for the passage of the products of combustion from the rear fire D' to the chimney are formed by the sides of the galley and the sides of the great boilers O', P', and Q'. (See Figs. 4, 5, 6.) They are marked $e\ f\ g\ h\ i\ k\ l\ m\ n\ d'$, and they all communicate with the rear flue, $p$, of the chimney. Their arrangement, which will be readily understood from an inspection of the drawings, is such that the great boilers are surrounded on all sides by the heated products of combustion on their way from the fire to the chimney.

The great boilers are inserted and removed through the top plate $K^2$, Fig. 1, and when in place rest by flanges on the edges of the apertures through which they are introduced. Their contents may be drawn off through cocks H' in their bottoms, or be dipped out at top, the lids being removed.

It will be observed that each fire is provided with a number of different apertures, through which it can receive the draft, all of which can be opened or closed at pleasure, thus affording complete control over the direction and intensity of the draft, and enabling advantage to be taken of the prevailing wind from whatever quarter it may blow. This is a matter of consequence on board ship where the currents of air between decks are liable to vary in direction with every change of wind.

When a meal is to be prepared for the whole crew, all the fires are brought into requisition, and advantage is taken of this occasion to bake large bread. Small bread, biscuits, and cakes can be baked readily with the heat from the middle front fire B'. To prepare the officers' meals, the front fires will suffice, while a meal for one or two persons can be prepared on either of the side fires, A' or C'.

Having thus fully described my invention, what I claim, and desire to secure by Letters Patent, is—

1. The combination and arrangement of the fire-places A', B', C', and D' and the oven E', substantially in the manner and for the purpose specified.

2. The arrangement and combination of the fire-places A', B', C', and D' with the oven F', substantially in the manner and for the purpose described.

3. The arrangement and construction of the fire places A' B' C', oven E', and side recesses, J K L and J' K' L', substantially in the manner set forth.

4. The arrangement in a ship's galley of three or more fire-places varying in capacity, substantially as and for the purpose described.

The above specification of my said invention signed and witnessed at Washington this 24th day of October, A. D. 1864.

WILLIAM YOUNG.

Witnesses:
   CHAS. F. STANSBURY,
   JOHN S. HOLLINGSHEAD.